(12) United States Patent
Roux et al.

(10) Patent No.: US 7,725,717 B2
(45) Date of Patent: May 25, 2010

(54) METHOD AND APPARATUS FOR USER AUTHENTICATION

(75) Inventors: Pierre Roux, Foch Argenteuil (FR); Marco Fratti, St. Germain en Laye (FR); Madjid F. Nakhjiri, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 992 days.

(21) Appl. No.: 11/217,003

(22) Filed: Aug. 31, 2005

(65) Prior Publication Data

US 2007/0050618 A1  Mar. 1, 2007

(51) Int. Cl.
*H04L 9/00* (2006.01)
*H04L 9/32* (2006.01)

(52) U.S. Cl. ............... 713/168; 713/182; 726/2; 726/4; 726/5

(58) Field of Classification Search ......... 713/168–170, 713/172, 182, 185–186; 726/2–5, 9
See application file for complete search history.

(56) References Cited

U.S. PATENT DOCUMENTS

| | | | |
|---|---|---|---|
| 5,534,855 A | * | 7/1996 | Shockley et al. ........... 340/5.52 |
| 6,484,260 B1 | | 11/2002 | Scott et al. |
| 6,703,918 B1 | | 3/2004 | Kita |
| 7,246,243 B2 | * | 7/2007 | Uchida ..................... 713/186 |
| 7,310,734 B2 | | 12/2007 | Boate |

\* cited by examiner

*Primary Examiner*—Hosuk Song
(74) *Attorney, Agent, or Firm*—Kenneth A. Haas; Valerie M. Davis

(57) ABSTRACT

The invention provides for secure end-to-end user authentication by a remote server communicating with a communication device. The communication device further communicates with an authentication device, which provides a user authentication message to the communication device for forwarding to the remote server. The authentication device comprises a data store for storing user authentication credentials. A user authentication processor performs a local authentication of a user of the authentication device in response to a user input. An authentication processor generates the authentication message if the user authentication is valid. The authentication processor implements a cryptographic function based on the user authentication credentials. A transmitter then transmits the authentication message to the at least one communication device.

20 Claims, 4 Drawing Sheets

METHOD AND APPARATUS FOR USER AUTHENTICATION

FIELD OF THE INVENTION

The invention relates to an apparatus and method for user authentication and in particular to user authentication using a wearable authentication device.

BACKGROUND OF THE INVENTION

Electronic interactions and transactions involving physically distant entities are becoming increasingly prevalent and is the basis of many commercial and non-commercial human interactions. Accordingly, security of such electronic transactions is becoming of increasing importance and a number of techniques have been developed to address such issues.

For example, online shopping over the Internet has in the latter years grown to become a substantial part of the economy. Such transactions need to be secure and resistant to security attacks. Such attacks include:

1. Eavesdropping meaning that attackers listen to the messages during their transport without the source or destination knowing.
2. Tampering meaning that attackers modify the messages in transport without being noticed by the receiver.
3. Impersonation is said to happen when a malicious party pretends to be the legitimate sender of the message and deceives the receiver to treat it as from the legitimate sender.
4. Replay attack covers intercepting a message and replaying it at later time without the receiver realising that it has been received more than once.

Furthermore, wireless and mobile communication has become increasingly widespread with a number of different communication systems providing different services and offering different advantages and characteristics. For example, cellular communication systems, such as GSM or UMTS, and Wireless Local Area Networks, such as IEEE 802.11 systems, have become commonplace and may provide the users with different access points to e.g. the Internet.

In order to facilitate and provide a coherent user experience, it is desirable to implement seamless mobility where it is possible for an end-user to seamlessly roam between different access networks without the user needing to take any action or even being aware of which access network is used. Seamless mobility for a terminal can be achieved via specific protocols and functionalities at the terminal and network side.

However, it is desirable to extend seamless mobility to the end-user rather than merely to a user terminal. Thus, it is desirable to enable an end-user to roam among different end-user terminals and networks while maintaining session continuity.

The user may specifically use a personal access network wherein different communication devices can be used to form the access point. Such a network can include elements such as a cellular subscriber unit, a cordless phone, a TV receiver, a digital audio receiver, a Personal Computer (PC) etc. Thus a number of different communication devices can be used to deliver a desired service.

However, such a scenario has significant impact on security aspects and requires additional functionality to ensure that secure communications and transactions can take place.

In particular, it is insufficient to merely authenticate a communication device providing a current access but rather it is desirable to authenticate the end-user itself. Thus, from the network perspective, a peer authentication guaranteeing that an authorized user is using an authorized device for consuming a specific service and authorizing a specific transaction should be provided.

Although, it is typically relatively straightforward to implement functionality allowing a communication device to be authenticated, a secure, reliable and user friendly user authentication is generally difficult to achieve.

Specifically, it has been proposed that user authentication may be achieved by a user entering a secret password. However, as human users are incapable of memorizing long cryptographic secrets, authentication methods based on human memory (passwords) lack sufficient cryptographic strength.

It has also been proposed to use a hardware element to store user security credentials that can be used for authenticating the user. However, such an approach is impractical as it requires the user to carry and use the hardware whenever user authentication is required. Furthermore, the approach does not provide sufficient security and personalization as the basic hardware element can be used by different people. For example a Subscriber Identity Module (SIM) for a mobile phone can be used by many users.

Thus, before such a hardware element can be used to authenticate a user towards the network, it needs to verify that the user is indeed the legitimate user. For mobile cellular communication systems, it has been proposed to combine the use of a SIM card with a personal four-digit PIN code as a way of personalizing the SIM card. Specifically, the user types a PIN code on the device carrying the SIM card as a way of verifying the identity to the device. However, a problem with this approach is that PIN codes are not considered cryptographically strong. Furthermore, once the PIN number has been provided by the legitimate user, the device becomes usable by anybody.

In U.S. Pat. No. 6,703,918, an end-user authentication method is described which uses a specific device worn by the end-user. The specific device communicates with an access point over a wireless communication link. However, the communication between the specific device and the access point is not cryptographically secure and therefore the system does not provide an optimal user authentication. Specifically, the described system will be sensitive to active security attacks such as replay attacks or monitoring/detection of signals transmitted over the wireless communication link.

Hence, an improved system for user authentication would be advantageous and in particular a system allowing improved security, facilitated operation and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus for user authentication comprising: an authentication device; at least one communication device for communicating with a remote server and the authentication device, the at least one communication device comprising means for receiving an authentication message from the authentication device and in response transmitting a user authentication message to the remote server;

wherein the authentication device comprises: a data store for storing user authentication credentials; a user authentication processor for authenticating a user of the authentication device in response to a user input; an authentication processor for generating the authentication message if the user authentication is valid, the authentication processor implementing a cryptographic function based on the user authentication credentials; and a transmitter for transmitting the authentication message to the at least one communication device.

The invention may allow improved user authentication. In particular, a more secure and/or reliable authentication can be achieved. A user authentication with facilitated operation can be achieved. In particular, a highly reliable authentication of an end-user may be achieved while allowing a practical and user friendly operation. A mutual authentication between user and service provider and/or a non-repugnable transaction establishment between them may be provided. In particular, the remote server may be provided with a user authentication message allowing secure and reliable authentication of the user.

In particular, in many embodiments, the invention provides a secure user authentication and/or transaction authentication. The invention may allow a mutual authentication to be established between a user and a third party service provider and/or may guarantee the integrity and/or the non-repugnability of a transaction between them.

The invention may e.g. allow a third party to be provided with a highly reliable user authentication message generated using a cryptographic function based on one or more user credentials stored only in the authentication device. The authentication may be validated by the third party using a corresponding cryptographic function and/or user authentication credentials. The use of cryptographic functions based on one or more user credentials may provide a very high level of security with high resistance to security attacks including attacks on a communication link between the communication device and the authentication device. A high degree of end-to-end security can be achieved without necessitating secure communication links. The high degree of reliability and security may be achieved regardless of the security characteristics of the communication link between the communication device and the authentication device and of the communication link between the communication device and the third party.

The authentication of the user may be in response to a user input such as a manual user input or a biometric input. The user authentication message transmitted from the communication message to the third party and the authentication message transmitted from the authentication device to the communication device may be the same message or the former may be derived in response to the latter. For example, the user authentication message may be generated by encapsulating the authentication message from the authentication device in order to facilitate or enable communication to the third party. A message may be any suitable signal or means of communicating information such as a modulated electrical signal, a data packet etc.

The cryptographic function may e.g. be a signing, an encryption or other cryptographic function applied to data. The communication device and the authentication device may be implemented as a single physical device and may for example be implemented as different processes on the same processing unit.

The communication from the communication device to the remote server may be through a communication network and may specifically be through the Internet.

According to an optional feature of the invention, the authentication device and the at least one communication device are arranged to communicate using a Private Key Infrastructure.

The authentication device may comprise a Public Key Infrastructure crypto-engine. The feature may provide a high degree of security and reliability of authentication. The PKI may be used for communications from the communication device to the authentication device and/or from the authentication device to the communication device.

According to an optional feature of the invention, the user input is a biometric input.

This may allow a practical and secure user authentication. In particular, the apparatus may comprise the data store for safely storing the user authentication credentials, a store for safely storing copies of biometrics related information, the means for receiving the biometric input, such as a sensor for sensing and performing a conversion of human biometrics into suitable data, and means for matching the sensed data and the stored biometrics data and only if these match are the authentication message generated and/or transmitted.

According to an optional feature of the invention, the user authentication device further comprises: a detector for detecting a wearable status of the authentication device; a state controller for entering an authenticated state in response to the authentication of the user when the wearable indication indicates that the authentication device is in a worn state, and for exiting the authenticated state in response to a detection of a disruption in the worn state of the authentication device; and the authentication device is arranged to transmit the user authentication message only if the authentication device is in the worn state.

This may allow improved security and/or facilitated operation for the user of the authentication device.

According to an optional feature of the invention, the at least one communication device is arranged to transmit an authentication request message to the authentication device; and the authentication device is arranged to transmit the authenticating message in response to receiving the authentication request message.

This may allow improved performance and may in particular allow an increased security authentication process. The authentication request message may be a user authentication request message.

According to an optional feature of the invention, the state controller is arranged to initiate the authentication of the user in response to receiving the authentication request message.

This may allow a user friendly and facilitated operation wherein a user authentication involving user activity or input is only performed when required. The state controller may be arranged to determine if the authentication device is in the authenticated state when the authentication request message is received. If so, no user authentication is performed but otherwise the authentication of the user is initiated.

According to an optional feature of the invention, the authentication request message comprises a transaction identification and the authentication processor is arranged to generate the authentication message in response to the transaction identification.

This may allow improved security and may for example provide improved security against replay attacks. The authentication processor may be arranged to generate the authentication message by encoding the transaction identification using the private key. The transaction identification may be any data specific to the transaction. In particular, the transaction identification may be a transaction hash or digest. Such a transaction hash or digest may be calculated on the basis of the transaction description using known digest algorithms.

In some embodiments, the authentication request message comprises a challenge and the authentication processor is arranged to generate the authentication message in response to the challenge, for example by encoding the challenge using the private key and including it in the authentication message.

According to an optional feature of the invention, the authentication device comprises a receive processor for authenticating the authentication request message.

Authentication of the authentication request message may provide a more secure system and may improve the reliability of the user authentication and the resistance to attacks. The authentication of the authentication request message may correspond to authenticating the service provider.

According to an optional feature of the invention, the authentication request message comprises at least some data encoded by a cryptographic function of the remote server and the receive processor is arranged to authenticate the authentication request message by decoding the data using a corresponding cryptographic function.

This may allow high security and reliability. The cryptographic function of the remote server may comprise using a remote server private key for the remote server and the corresponding cryptographic function may comprise using a remote server public key. The communication device and the authentication device may comprise PKI crypto engines for the communication from the communication device to the authentication device and/or from the authentication device to the communication device.

According to an optional feature of the invention, the at least one communication device comprises a user interface for presenting transaction details and a transaction identity for a transaction to be authorised, and the authentication device comprises a user interface for presenting the transaction identity.

This may allow a user friendly and highly secure means of authorising a transaction by the user.

According to an optional feature of the invention, the user authentication credentials comprise a private key.

This allows a practical implementation and a secure system. In particular, the use of a private key may allow an easy verification by the remote server using the corresponding public key.

According to an optional feature of the invention, the private key is a private key for the user.

This may allow an end to end secure authentication wherein the third party can be sufficiently certain that the end-user is the assumed end-user. The private key of the user may be stored in the authentication device thereby obviating the requirement of the user remembering the key and/or the impracticality of the user manually entering the private key.

According to an optional feature of the invention, the authentication device further comprises a security association for the authentication device and the authentication processor is arranged to further generate the authentication message in response to the security association.

This may provide a system with highly secure and reliable authentication of a user by a third party and may in particular allow independent authentication of both the authentication device and the end-user. The security association may comprise the use of an authentication device private key.

According to an optional feature of the invention, the authentication device is arranged to communicate with a plurality of communication devices over a personal access network.

The authentication device may be used with a plurality of communication devices in a personal access network thereby providing a flexible system where services, transactions and/or applications may be provided in the most suitable way while allowing a secure user authentication which is independent of the transport means used. A user friendly and practical means of enabling secure user authentication may be provided.

According to an optional feature of the invention, the communication device and the authentication device are arranged to communicate using a wireless communication link.

This may allow facilitated use and an increased flexibility for implementation and use as the communication device and the authentication device may be physically separate.

According to an optional feature of the invention, the at least one communication device and the authentication device are arranged to communicate using a secure communication link.

The communication between the third party and the communication device may alternatively or additionally be by a secure communication link.

The feature may allow improved security and a reliable system. In particular, the secure communication link may be a link for which a security environment has been established. For example, an encryption framework may be set up for the communication from the communication device to the authentication device and/or from the authentication device to the communication device.

According to an optional feature of the invention, the at least one communication device and the authentication device are arranged to communicate using an unsecured communication link.

The communication between the third party and the communication device may alternatively or additionally be by an unsecured communication link.

The invention may allow a highly secure user authentication without requiring secure communication between the involved entities. For example, transmitting a private key encoded authentication message (such as a digital signature) from the authentication device to the remote server allows the remote server to accurately verify that the authentication message indeed originates from the authentication device. Specifically, using a private key/public key authentication system improves the resistance to security attacks. Even using unsecured communication links does not enable security attacks such as impersonation or replay attacks (e.g. by encoding a challenge using the private key). Hence, a high degree of flexibility in the selection of communication means can be used and many available communication links can be used.

According to an optional feature of the invention, the at least one communication device comprises means for communicating with a plurality of authentication devices over a personal access network.

The communication device may be used with a plurality of authentication devices in a personal access network thereby providing a flexible system where services, transactions and/or applications may be provided in the most suitable way while allowing a secure user authentication which is independent of the transport means used. A user friendly and practical means of enabling secure user authentication may be provided. A high degree of flexibility and an improved independence of equipment when providing services may be achieved. For example, a communication device may be used by a group of users and a user authentication for a specific user may be achieved by interacting with the authentication device of that user.

According to another aspect of the invention, there is provided an authentication device for user authentication comprising: a data store for storing user authentication credentials; a user authentication processor for authenticating a user of the authentication device in response to a user input; an authentication processor for generating the authentication message if the user authentication is valid, the authentication processor implementing a cryptographic function based on the user authentication credentials; and a transmitter for transmitting the authentication message to at least one communication device for communication with a remote server.

According to another aspect of the invention, there is provided a method of user authentication in a communication system including an authentication device and at least one communication device for communicating with a remote server and the authentication device, the method comprising: the authentication device storing user authentication credentials; the authentication device authenticating a user of the authentication device in response to a user input; the authentication device generating the authentication message if the user authentication is valid, the authentication processor implementing a cryptographic function based on the user authentication credentials; the authentication device transmitting the authentication message to the at least one communication device; the at least one communication device receiving the authentication message; and the at least one communication device forwarding a user authentication message in response to the authentication message to the remote server.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to applications, transactions and services involving the Internet. However, it will be appreciated that the invention is not limited to this application but may be applied to many other systems, applications and services.

Figure 1:
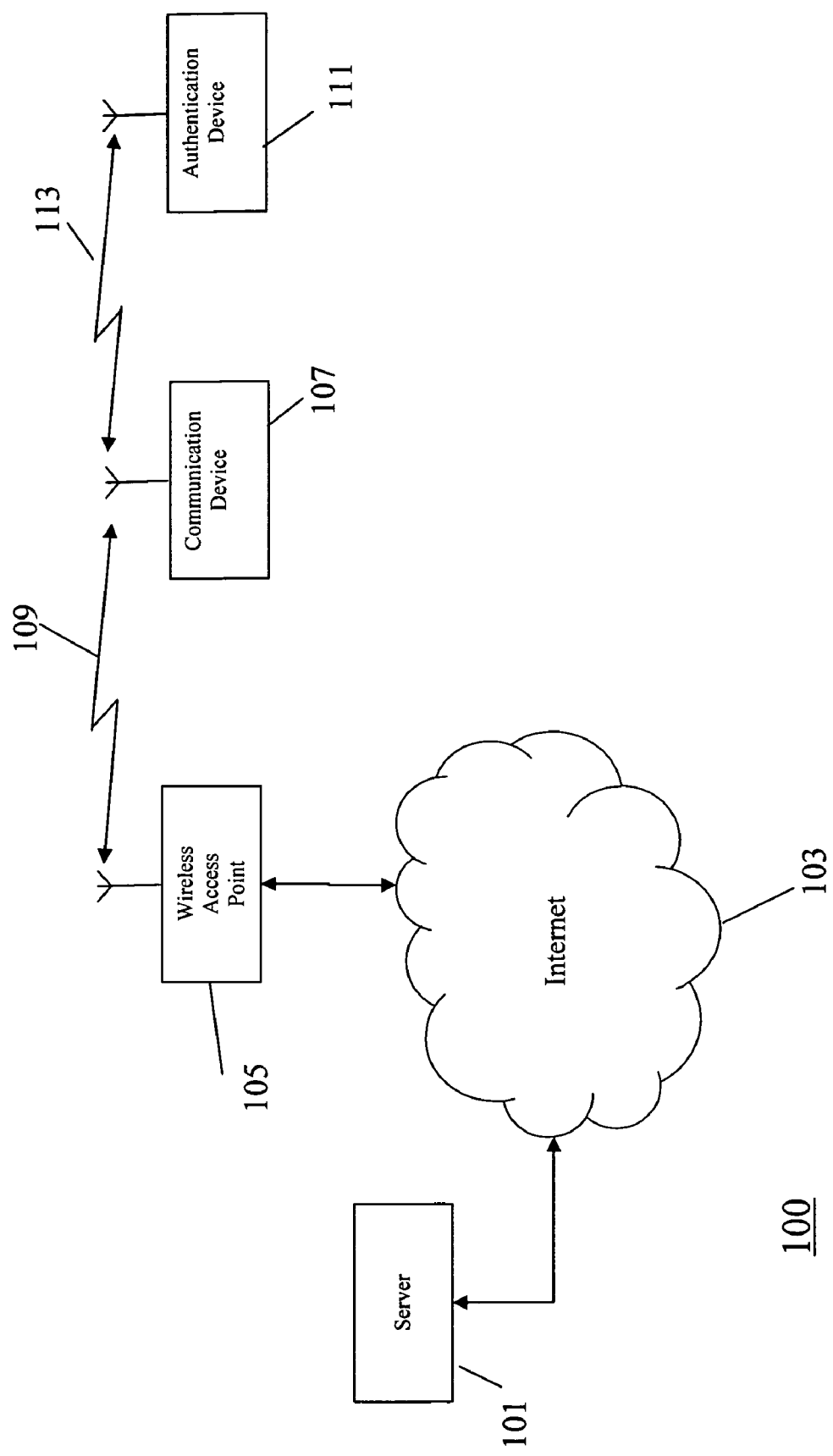
FIG. 1 illustrates a communication system in accordance with some embodiments of the invention.

FIG. 1 illustrates a communication system in accordance with some embodiments of the invention.

The communication system of FIG. 1 comprises a remote server 101 which is coupled to the Internet 103. The Internet 103 is furthermore coupled to a wireless access point 105. The wireless access point 105 communicates with a communication device 107 over a wireless communication link 109.

In the example, the communication device 107 operates an application which involves interaction with the server 101. In the specific example, the communication device 107 is running an online shopping application provided by the server 101. Thus, in the example, data is exchanged between the server 101 and the communication device 107 via the Internet 103 and the wireless access point 105.

It will be appreciated that the wireless access point 105 may be any suitable access point and that the wireless communication link 109 may be a wireless communication link of any suitable communication system. For example, the wireless access point 105 may be a cellular base station, a WLAN access point or any other suitable access point for the Internet.

In accordance with embodiments of the invention, the system of FIG. 1 furthermore comprises functionality for performing an end-to-end user authentication. For example, the user of the communication device 107 may have a private account with the operator of the server 101 such that the user may make purchases for which the value is automatically debited the private account. However, in order to acknowledge a purchase request received from the communication device 107, the server must ensure that it is placed by the correct user.

In the example, of FIG. 1, the system further comprises an authentication device 111 which can provide an end-to-end user authentication to the server 101. The authentication device 111 comprises functionality for communicating with the communication device 107 over a second wireless communication link 113.

In the specific example, the authentication device 111 is a wearable device which is worn by the user. As specific examples, the authentication device 111 may be implemented as a watch, bracelet, broche, necklace or an item of clothes. For brevity, the following description will focus on the authentication device 111 being implemented as a watch to be worn on the wrist of the user.

The authentication device 111 comprises functionality for generating an end-to-end user authentication which can be used by the third party operating the server 101 to ensure that the purchase transaction is authorised by the end-user.

Specifically, if the user selects an item for purchase, this is communicated from the communication device 107 to the server 101. In response, the server 101 transmits a user authentication request to the communication device 107. When receiving this, the communication device 107 transmits an authentication request message to the authentication device 111 over the communication link 113. In response to receiving the request, the authentication device 111 determines if an end-to-end user authentication should validly be given, and if so it generates an authentication message which is transmitted back to the communication device 107. Specifically, the authentication device 111 performs a local user authentication between the user and the authentication device 111 to determine if the correct user is using the authentication device 111. If so, the authentication device 111 proceeds to generate the authentication message which is used for the end-to-end user authentication. The communication device 107 then forwards this authentication message to the server 101 via the communication link 109, the wireless access point 105 and the Internet 103. When the server 101 receives the authentication message it may evaluate the received data and determine if this corresponds to a valid user authentication. If so, the purchase transaction is authorised and will be completed. Otherwise, the transaction is refused. Specifically, the user authentication message is generated using a cryptographic function based on user credentials stored locally in the authentication device 111. The user credentials are specific to the registered user and the remote server 101 can use knowledge of the user credentials to check that the correct user is authenticated.

Thus, in the example, the user is separated from the communication device 107 and the end-to-end user authentication is performed by the authentication device 111 and not the communication device 107. Thus, even if the communication device 107 is a shared device or is e.g. stolen, this cannot be used by non-legitimate users to authenticate a service or transaction.

Thus, services, such as financial transactions or subscription based services that require presence of a specific user can be authorized based on credentials that are specific to the user rather than those issued to the device. The user may specifically be a human, whose identity is recognized by the remote server 107.

Figure 2:
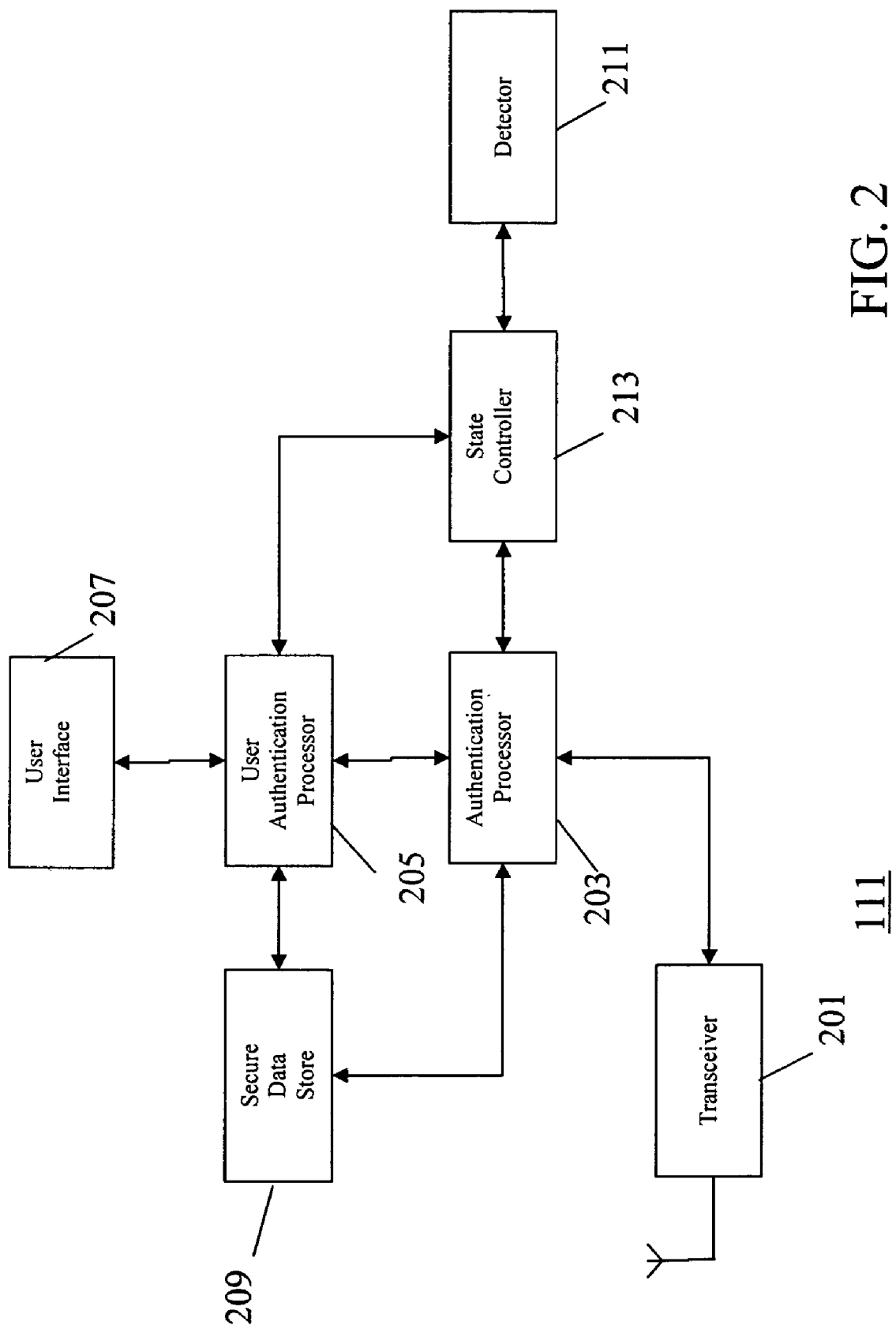
FIG. 2 illustrates an authentication device in accordance with some embodiments of the invention.

FIG. 2 illustrates the authentication device 111 in more detail. The authentication device 111 is in the specific example a wearable device which is carried by a user. For example, the authentication device 111 can be part of an item of clothing such as a belt, necklace, purse band, phone headset or can be an item which is attached to the user or the user's clothes.

The authentication device 111 comprises a transceiver 201 which is arranged to communicate with the communication device 107 over a wireless communication link. It will be appreciated that in other embodiments, the communication link may be a wired communication link and/or may be an internal communication link. For example, the authentication device 111 and the communication device 107 may be implemented in the same device or even processor and the communication between the authentication device 111 and the communication device 107 may simply correspond to passing data between different software subroutines.

In the specific example, the transceiver 201 receives the authentication request message from the communication device 107 following an end-to-end user authentication request from the remote server 101.

The authentication device 111 further comprises an authentication processor 203 which is coupled to transceiver 201. The authentication processor 203 is passed the authentication request message from the communication device 107 and in response it generates an authentication message.

Specifically, the authentication processor 203 generates the authentication message using a cryptographic function based on user authentication credentials for the legitimate user of the authentication device 111.

The authentication processor 203 is coupled to a user authentication processor 205. When the authentication processor 203 receives a user authentication request, it requests a local user authentication from the user authentication processor 205. The local user authentication is an authentication between the authentication device 111 and the user which ensures that the correct user is using the authentication device 111.

The user authentication processor 205 is coupled to a user interface 207 which can interface with the user to provide a user input that can be validated by the user authentication processor 205.

The user authentication processor 205 is furthermore coupled to a tamper free secure data store 209. The secure data store 209 comprises user data that is used to check the user input.

As a specific example, the user interface 207 may comprise a biometric sensor that can record a biometric input. For example, the user authentication processor 205 may request that a finger is placed on a built-in fingerprint monitor.

In response, a signature or hash for the fingerprint may be calculated by the user authentication processor 205. The secure data store 209 can retrieve a reference fingerprint signature or hash for the legitimate user from the secure data store 209. If the user authentication processor 205 determines that these match, a successful local user authentication has been achieved. Otherwise, an error message is generated. Thus, the approach ensures that the user is the legitimate user for the authentication device 111.

Biometrics may be considered to be physical attributes, such as finger prints and retina scans, that are specific to each human.

As another example, the secure data store 209 may comprise a secret key entry sequence for the legitimate user and the user authentication processor 205 may request that the current user enters this sequence. If the entered sequence matches the secret reference sequence, a successful local user authentication is deemed to have occurred.

If the local user authentication is successful, the authentication processor 203 is informed. Consequently, the user authentication processor 205 proceeds to retrieve the user authentication credentials from the secure data store 209. It then proceeds to generate the user authentication message by applying a cryptographic function based on the user credentials.

The user authentication credentials can be credentials that verify the user's claim to be the specified identity. Thus, these credentials are the credentials that can be used in the cryptographic processes that accomplish an end-to-end authentication protocol between the user and the remote server.

The user authentication credential may be a private key out of a public/private key pair, specifically generated for that person or a random number generated through a hardware/software token (ACE card).

As a specific example, the authentication device 111 may sign data received from the remote server 101 using a private key assigned to the user. This signed data is then included in the authentication message and is transmitted to the communication device 107 and from there to the remote server 101. The remote server 101 can then verify the signing by applying the public key of the user to the originally transmitted data. If the verification is successful, a reliable and secure end-to-end user authentication has been achieved.

In some embodiments, the local user authentication may be facilitated. In particular, the authentication device 111 may comprise functionality for operating in a locally user authenticated state wherein no explicit local user authentication is required and in a non-authenticated state wherein a local user authentication is required before an authentication message can be generated.

Specifically, in the example of FIG. 2 where the authentication device 111 is a wearable device separate from the communication device 107, the authentication device 111 comprises a detector 211 which can detect a wearable status of the authentication device 111. In the example of FIG. 2, the detector 211 is a binary detector which is simply arranged to detect whether the authentication device is worn or not worn. It will be appreciated that any suitable mechanism, criterion or algorithm for determining the wearable status of the authentication device 111 may be used without detracting from the invention.

For example, the detector 211 may simply detect whether the wristband of the watch is closed or open. A closed position may be considered to correspond to a worn state and the open position may be considered to correspond to a non-worn state. The opening and closing of the wristband may simply be determined by an electrical continuity detection.

A more reliable detection can e.g. be achieved by including Radio Frequency signal cables in the wristband of the authentication device 111 and use the detector 211 to measure the impedance of the cables. As the impedance will vary significantly based on whether the wristband is located around the wrist or not, an accurate determination of the worn status can be achieved.

The detector 211 is coupled to a state controller 213. The state controller 213 is arranged to control whether the authentication device 111 is in an authenticated state wherein a user authentication message can be generated and transmitted, or in a non-authenticated state wherein such a user authentication cannot be generated.

In particular, when the authentication device 111 is first attached or put on by the user, the state controller 213 enters the authentication device into a non-authenticated state as it could be potentially be worn by any user and not just by the legitimate user.

When a request for an end-to-end user authentication of the end-user is received from the communication device 107, the user authentication processor 205 initially initiates the state controller 213 to determine if the authentication device 111 is already in the authenticated state.

If not, the user authentication processor 205 proceeds to perform a local user authentication which will authenticate the user to the authentication device 111 as previously described. As mentioned, the local user authentication is based on a user input. For example, the user is requested to input a secret password and if this password matches that stored for the user in the secure data store 209, the user authentication processor 205 considers the user to be the legitimate user and it accordingly informs the state controller 213 which proceeds to enter the authenticated state. If the password does not match, the state controller 213 does not change the state but remains in the non-authenticated state.

The state controller 213 is coupled to the detector 211 and the authenticated state is only entered if the detector 211 indicates that the authentication device 111 is worn by the user. Furthermore, when in the authenticated state, the state controller 213 continuously receives indications of the worn status of the authentication device 111. If there is a detection that the authentication device 111 is no longer worn, the state controller 213 immediately enters the authentication device 111 into the non-authenticated state.

However, as long as the state controller 213 does not detect a disruption to the worn state, the authentication device 111 is kept in the authenticated state. When a user authentication request message is received and the user authentication processor 205 is informed that the user authentication device 111 is in the authenticated state, it informs the authentication processor 203 without requiring a new user input or local user authentication. The authentication processor 203 thus proceeds to generate and transmit the user authentication message.

Thus, in the example, the first time a user authentication request is received from the communication device 107 after the authentication device 111 has been attached by the user, the user authentication processor 205 requests a user input. If the input is valid, the authentication device 111 is considered valid.

This authentication state is subsequently maintained for subsequent authentication requests allowing the authentication request to be responded to without requiring further activity by the user. However, if the worn state is disrupted, indicating that the device is no longer attached to the user, the authentication device 111 immediately enters a non-authenticated state wherein an authentication request is not replied to.

In the example of FIG. 2, the authentication message is generated using a private key associated with the user. More specifically, the authentication request message may include data which identifies the transaction, such as a transaction identity or other challenge, and the data may be encoded using the private key.

The transceiver 201 subsequently transmits the authentication message to the communication device 107 over the communication link 113 and from the communication device it is then transmitted to the server 101.

The challenge of the authentication request message can be generated by the server 101. When receiving the encoded authentication information, the server 101 can apply the public key associated of the user of the authentication device 111 and if this results in the original challenge data, the user has been end-to-end authenticated with high reliability and the transaction can proceed.

The authentication processor 203 specifically comprises a Public Key Infrastructure (PKI) crypto-engine which is capable of receiving input data (e.g. challenge data), performing cryptographic algorithms and outputting the result. The authentication device 111 also comprises the secure data store 209, which is secure and tamper free storage wherein the private key is stored. The crypto-engine can furthermore be arranged to establish security associations and perform encrypted communications with the communication device 107.

Thus, it will be appreciated that the system may utilize separate security processes for providing the specific operation. Thus, the system may use a first set of user data for the local user authentication (e.g. a signature of a fingerprint or a secret key input sequence) and a different set of data for the cryptographic end-to-end authentication in the form of the user authentication credentials. Specifically, a private key may be used in the authentication device 111 and the corresponding public key in the remote server 101. In addition, a security association using e.g. encryption or authentication data and algorithms may be used for the communication between the communication device 107 and the authentication device 111.

However, it will be appreciated that one of the advantages of the system of FIG. 1 is that highly secure end-to-end-user authentication can be achieved without necessitating highly secure communication links. Rather, the use of a PKI based authentication provides a highly secure user authentication while allowing simple and non-intrusive operation by the end-user.

Specifically, the described authentication device enables the use of PKI-based certificates for user authentication and at the same time physically separates the user from the communication devices. The authentication device is capable of being included in a generic security architecture that complies with network security requirements and procedures on mutual authentication and replay protection.

Furthermore, the authentication device can be kept access technology and operator independent and can be made capable of performing key exchange and encryption functions to avoid the requirement for secure communications.

The exchange of authentication and key management signaling with the operators of e.g. the access point and/or the server can be performed by the communication device 107. The communication device 107 can also hold proper credentials for device authentication and can handle any security mechanism that relies on device-credentials only. Thus, the communication device 107 may independently provide a high degree of security and authentication for the applications and services and may interact with the authenticating device only when user authentication is required.

The above example focused on a dedicated communication between a single communication device 107 and a single authentication device 111. However, it will be appreciated that the concepts are equally applicable to a system wherein a personal access network is used that allows a plurality of communication devices and/or authentication devices.

For example, the personal access network may include a number of communication devices such as a personal computer, a cellular subscriber unit and a WLAN base station which can all be used by the same user. The authentication device 111 may be capable of communicating with any of these devices thereby forming a network wherein a given service may be provided through the most practical means. The communication may for example be achieved by all devices being Bluetooth™ capable.

Similarly, a number of authentication devices associated with the same or different users may be employed. For example, a personal computer may be used by a group of users and may be capable of accessing an individual authentication device by specifically addressing transmissions over the personal access network to the identity of this specific authentication device.

In the following a more detailed description of an example of a user authentication will be described with reference to FIG. 3.

Initially, at time 301, a user is running an application on the communication device 107 which involves a third party server 101. The user is wishing to consume a service, requiring the user's identity to be securely established by the third party. A service provider certificate for the third party and a list of certification authorities trusted by the third party are obtained for further use by the communication device 107.

In the example, it is assumed that the communication device 107 and the server 101 have authenticated each other and established trust using a suitable device authentication algorithm.

However, in the example, the third party is unaware of the user and of the authentication device 111. Also the authentication device can be unaware of the interaction between the communication device 107 and the server 101.

At some point during the service, the server sends a request for an end-to-end user authentication to the communication device 107. The server 101 can specifically send authentication related data along with this request to the communication device 107.

For example, the user authentication request can be accompanied by data used for negotiation of security methods (algorithms, key sizes etc) as well as authentication related data (such as challenges from the server 101).

In some embodiments, the server 101 also authenticates itself to the authentication device 111 and the end-to-end user authentication request may comprise authentication-related data which is signed with a private key of the server 101. The request can also be accompanied by a certificate for the server 101. Thus, the authentication device 111 can apply the public code of the server 101 to verify that the user authentication request is indeed received from the server 101.

As another example, the server 101 can send such data to the communication device 107, which in turn signs the data on behalf of the server 101 based on the keys derived from the security association between the communication device 107 and the server 101. This is a suitable approach when the signature is verifiable at the authentication device 111 using the server certificate. For instance, the key for verification of the signature can be derived partly from the server public key and partly from the keys derived between the communication device 107 and the authentication device 111.

At time 303, the communication device 107 monitors the local environment to determine an authentication device associated with the user.

In some embodiments, the communication device is a private device which is associated with only one authentication device. In such an example security mechanisms associated with the used communication standard can be used for pairing a communication device with an authentication device (e.g. a Bluetooth pairing mechanism can be used).

In other embodiments, the communication device 107 can be a shared device used by several users and can accordingly be paired with different authentication devices. In such an example, the communication device 107 may select an appropriate authentication device by determining the identity of the user for which the user authentication is required and then address this specific authentication device in the subsequent communication.

The communication device 107 and the authentication device 111 can establish a security association at this point in order to protect their communications. This may be independent of the end-to-end user authentication.

When a suitable authentication device 111 has been identified, the communication device 107 sends an authentication request message 305 to the authentication device. This message comprises the authentication-related data from the server 101 in order to let the authentication device 111 authenticate the third party and the server 101. Specifically the authentication device 111 can check that the third party belongs to the current list of trusted service providers.

The server 101 and/or the communication device 107 can include challenge data in the message which must be included in the signed response from the authentication device 111 for anti-replay protection. Each challenge will only be used once.

If a secure channel between the communication device 107 and the authentication device 111 is in place, the challenge and other data can be communicated over this secure channel.

At time 307, the authentication device 111 receives the authentication response message and parses the list of certification authorities trusted by the third party in order to determine if there is a certificate stored in the authentication device 111 which is signed by one of those certification authorities. If none is found, then the authentication will not take place, and an appropriate failure code is returned to the communication device 107.

At time 309, the authentication device 111 checks the received certificate from the third party. When the third party identity is established the authentication device 111 checks if the third party belongs to its list of trusted service providers or not. If so, the authentication proceeds.

If the certification authority signing this certificate is not trusted by the authentication device 111 or if the test fails, the authentication terminates and an appropriate failure code is returned to the communication device 107.

Figure 3:
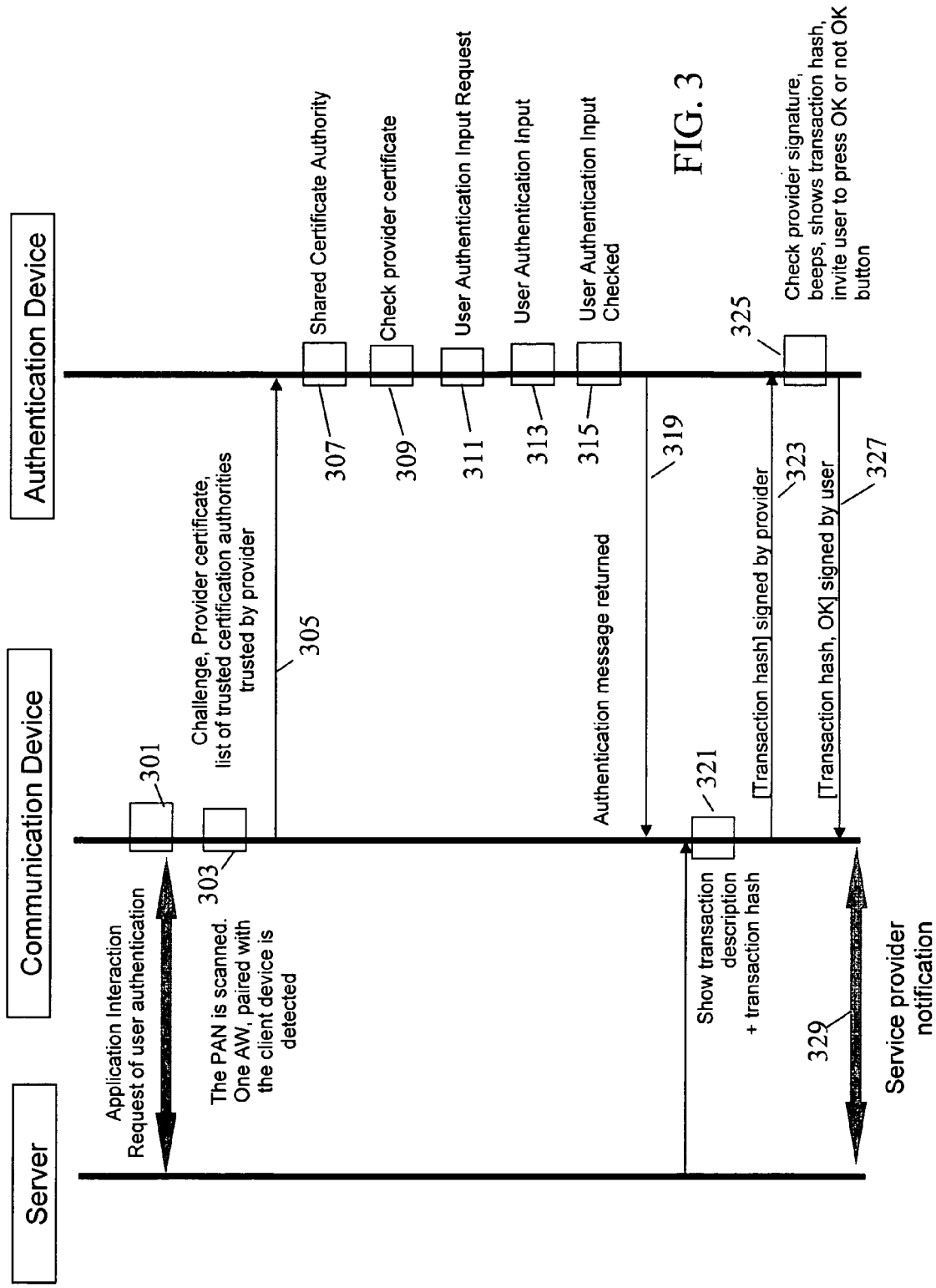
FIG. 3 illustrates an example of a user authentication in accordance with some embodiments of the invention.

In the example of FIG. 3, the authentication device 111 is an authentication device comprising functionality for being in a worn-authenticated state and in a non-authenticated state as described with reference to FIG.2. Thus, the authentication device 111 is initially in the non-authenticated state and accordingly the user authentication device 205 proceeds perform a local user authentication to verify that it is the legitimate user wearing the authentication device 111. Until this is performed, the authentication device 111 is considered unreliable as it cannot be guaranteed that the user is the legitimate user of authentication device 111.

The authentication device 111 can e.g. generate a beep that indicates to the user that an active input for user authentication is required.

In the specific example, the local user authentication which is used to authenticate the authentication device 111 takes place the first time a user authentication is required after the authentication device has been put on by the user or after a disruption in the word state has been experienced. It will be appreciated that this is merely an example and that the user may e.g. perform a local user authentication as the authentication device 111 is attached to the user.

At time 311 the authentication device 111 requests a user input and at time instant 313 this is received from the user. Specifically, the user may enters the secret sequence and/or present his finger for fingerprint capture. An appropriate failure code can be returned if the user does not provide a response within a given predetermined time.

The user may provide the required user input e.g. by
- entering a secret sequence on keys of the authentication device 111,
- pressing a finger on a fingerprint capture element of the authentication device 111,
- presenting a type of biometric data (retina scan, finger top swipe, etc) to the authentication device 111.

At time 315, the user input is checked and if it matches the required response stored in the authentication device 111, the state controller 213 enters the authentication device into the authenticated state. The authentication device 111 can from this point onwards be considered locally authenticated by the legitimate user.

In some embodiments where finger prints or other biometric information is used, the authentication device 111 can create a bitmap of the presented biometric characteristic. The authentication device 111 can then calculate a hash of the bitmap and check the hash with one securely stored in the authentication device 111. If the check fails, an appropriate failure code is returned to the communication device 107 which in turn forwards a negative authentication to the server 101.

If the user authentication is successful, the authentication processor 203 then proceeds to calculate a signature using information from the received authentication request message (challenge data) and using the user's private key.

Specifically, the authentication processor can generate user authentication credentials, UAC, as:

UAC=Hash_signature (User Private key, User ID, challenge, other data)

Other data can include the bitmap of the biometrics (or other protocol related information). The UAC is considered to be the user authentication credentials which are sufficient for user authentication.

The authentication device 111 continues by sending an authentication message 317 generated by a cryptographic function based on the UAC, and the user certificate corresponding to the private key used for the signature (signed by a certification authority trusted by the third party) to the server 101 via the communication device 107.

In order to avoid unnecessary round-trips to the server 101 or denial of service attacks from rogue authentication attempts, the authentication device 111 may append the challenge value in the clear to the authentication message. If the communication device 107 receives a message from the authentication device 111 which includes an invalid or outdated challenge, it can simply discard the message without forwarding it to the server 101 or can issue a message indicating the failure to the server 101.

At time 319, the authentication message is received from the authentication device 111 and if the communication device 107 determines that the message is valid (e.g. that it has valid challenge data and complies with the security checks for the communication link) the message is forwarded to the server 101 for verification.

The server can then apply the public key of the end-user to verify the authentication. For example, if the application of the end user's public key results in the original challenge data being recovered, a successful end-to-end authentication is considered to have taken place.

If a problem occurs during verification (e.g. because the certificate cannot be checked or the user is not authorized to consume the service) then a failure process will be initialized.

Following this procedure, the server 101 has successfully authenticated the user of the authentication device 111. Subsequent authorizations for transactions may accordingly be authorized by a simplified authentication process.

For example, a transaction relating to an online purchase can simply be authorized as follows.

At time instant 321 the communication device 107 receives a transaction description from the server 101.

Figure 4:
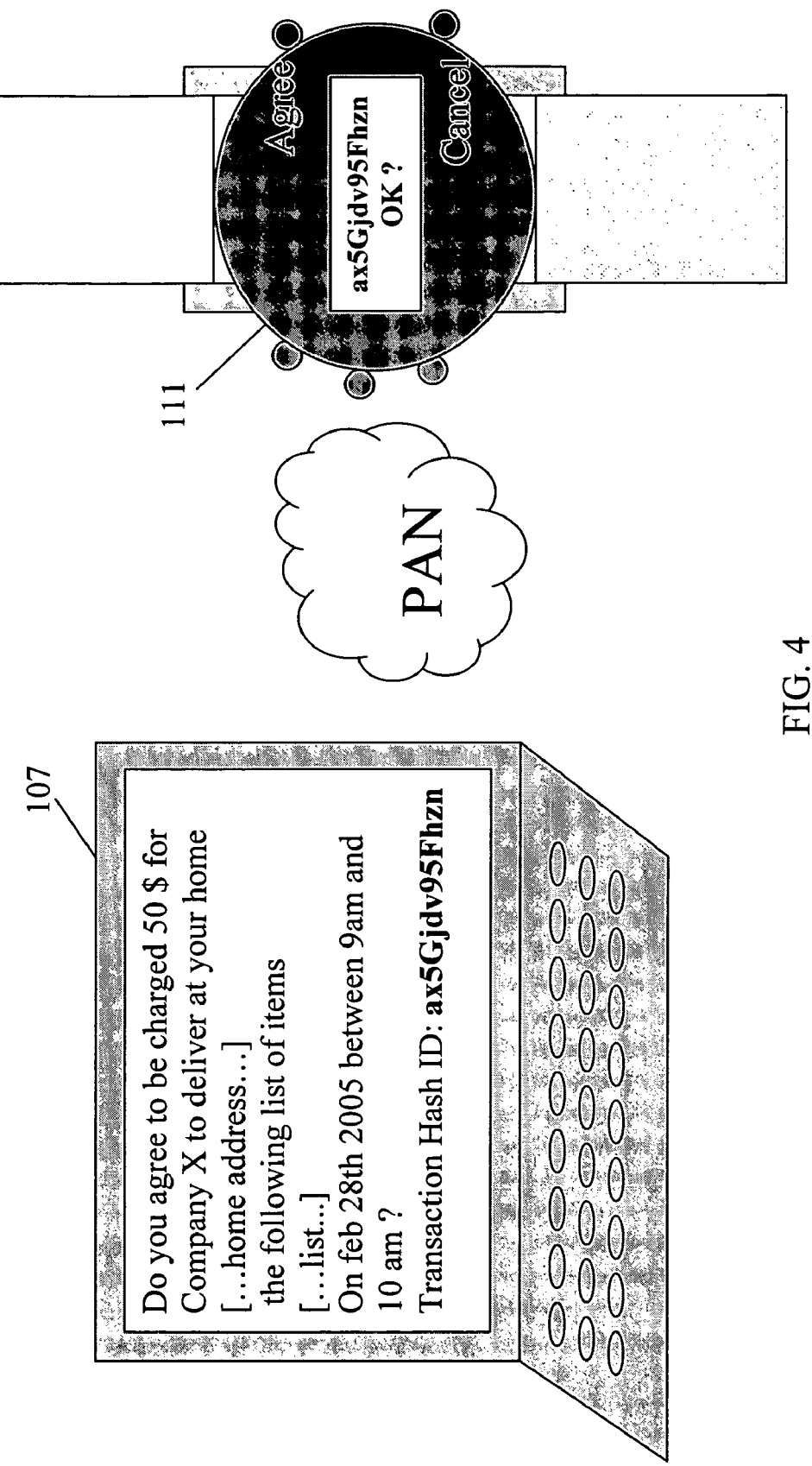
FIG. 4 illustrates a specific example of an implementation of a communication device and an authentication device in accordance with some embodiments of the invention.

FIG. 4 illustrates a specific example of an implementation of the communication device 107 and the authentication device 111.

In the example, the communication device is a portable computer communicating with an authentication device 111 implemented as a watch. In the example, the communication device 107 displays the transaction details on a display of the personal computer. In addition, a hash of the transaction description is calculated and presented on the display. The hash is short enough to be shown on a small display, i.e. it contains relatively few characters.

An authentication request message 323 is then sent to the authentication device 111. The authentication request message comprises the transaction hash and comprises a signature from the third party.

Specifically, the transaction hash may be signed by the server 101.

At time instance 325, the authentication device 111 checks the third party signature and then presents the transaction hash on the display of the watch. The authentication device 111 may further alert the user, for example by a short auditory signal. The user can then check that the transaction hash or identity is identical to the one presented on the display of the communication device 107.

If the user agrees with the transaction, he presses the OK button on its authentication device 111.

The authentication processor 203 ensures that the authentication device 111 is still in the authenticated state, and if so, proceeds to generate the authentication message.

The authentication message 327 comprising e.g. the transaction hash encoded using the users private key is then sent back to the communication device 107.

When receiving the authentication message, the communication device 107 proceeds to generate a message for the server 101 which comprises the authentication data. The message 329 is then sent back to the server 101 thereby providing a reliable end-to-end user authentication and authorization for the transaction.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. An apparatus for user authentication comprising:
   an authentication device;
   at least one communication device for communicating with a remote server and the authentication device, the at least one communication device sending an authentication request message to the authentication device, the authentication request message comprising authentication-related data from the remote server to enable the authentication device to authenticate the remote server;
   wherein the authentication device comprises:
   a data store for storing user authentication credentials;
   a user authentication processor for authenticating a user of the authentication device in response to a user input;
   an authentication processor for generating an authentication message if the user authentication is valid, the authentication processor implementing a cryptographic function based on the user authentication credentials; and
   a transmitter for transmitting the authentication message to the at least one communication device.

2. The apparatus of claim 1 wherein the authentication device and the at least one communication device are arranged to communicate using a Private Key Infrastructure.

3. The apparatus of claim 1 wherein the user input is a biometric input.

4. The apparatus of claim 1 wherein the user authentication device further comprises
   a detector for detecting a wearable status of the authentication device;
   a state controller for entering an authenticated state in response to the authentication of the user when the wearable indication indicates that the authentication device is in a worn state, and for exiting the authenticated state in response to a detection of a disruption in the worn state of the authentication device; and
   the authentication device is arranged to transmit the user authentication message only if the authentication device is in the worn state.

5. The apparatus of claim 1 wherein the user authentication processor is arranged to initiate the authentication of the user in response to receiving the authentication request message.

6. The apparatus of claim 1 wherein the authentication request message comprises a transaction identification and the authentication processor is arranged to generate the authentication message in response to the transaction identification.

7. The apparatus of claim 1 wherein the authentication device comprises a receive processor for authenticating the authentication request message.

8. The apparatus of claim 7 wherein the authentication request message comprises at least some data encoded by a cryptographic function of the remote server and the receive processor is arranged to authenticate the authentication request message by decoding the data using a corresponding cryptographic function.

9. The apparatus of claim 1 wherein the at least one communication device comprises a user interface for presenting transaction details and a transaction identity for a transaction to be authorised, and the authentication device comprises a user interface for presenting the transaction identity.

10. The apparatus of claim 1 wherein the user authentication credentials comprise a private key.

11. The apparatus of claim 10 wherein the private key is a private key for the user.

12. The apparatus of claim 1 wherein the authentication device further comprises a security association for the authentication device, and the authentication processor is arranged to further generate the authentication message in response to the security association.

13. The apparatus of claim 1 wherein the authentication device is arranged to communicate with a plurality of communication devices over a personal access network.

14. The apparatus of claim 1 wherein the communication device and the authentication device are arranged to communicate using a wireless communication link.

15. The apparatus of claim 1 wherein the at least one communication device and the authentication device are arranged to communicate using a secure communication link.

16. The apparatus of claim 1 wherein the at least one communication device and the authentication device are arranged to communicate using an unsecured communication link.

17. The apparatus of claim 1 wherein the at least one communication device comprises means for communicating with a plurality of authentication devices over a personal access network.

18. The apparatus of claim 1 wherein the authentication request message comprises unique challenge data from at least one of the communication device or server, the challenge data included in the authentication message.

19. An authentication device for user authentication comprising:
   a data store for storing user authentication credentials;
   a state controller for controlling, when the device is worn by a user, whether the authentication device is in an authenticated state in which an authentication message can be generated, or a non-authenticated state in which the authentication message cannot be generated;

a user authentication processor for authenticating the user of the authentication device in response to a user input when the authentication device is in the non-authenticated state;

an authentication processor for generating the authentication message if the user authentication is valid, the authentication processor implementing a cryptographic function based on the user authentication credentials; and a transmitter for transmitting the authentication message to at least one communication device for communication with a remote server.

20. A method of user authentication in a communication system including an authentication device and at least one communication device for communicating with a remote server and the authentication device, the method comprising:

the authentication device receiving an authentication request message from the at least one communication device, the authentication request message comprising authentication-related data from the remote server to enable the authentication device to authenticate the remote server;

the authentication device storing user authentication credentials;

the authentication device authenticating a user of the authentication device in response to a user input;

the authentication device generating an authentication message if the user authentication is valid, the authentication device implementing a cryptographic function based on the user authentication credentials;

the authentication device transmitting the authentication message to the at least one communication device;

the at least one communication device receiving the authentication message; and the at least one communication device forwarding a user authentication message in response to the authentication message to the remote server.

* * * * *

UNITED STATES PATENT AND TRADEMARK OFFICE
CERTIFICATE OF CORRECTION

| | | |
|---|---|---|
| PATENT NO. | : 7,725,717 B2 | Page 1 of 1 |
| APPLICATION NO. | : 11/217003 | |
| DATED | : May 25, 2010 | |
| INVENTOR(S) | : Roux et al. | |

It is certified that error appears in the above-identified patent and that said Letters Patent is hereby corrected as shown below:

In Column 17, Line 64, in Claim 4, delete "claim I" and insert -- claim 1 --, therefor.

Signed and Sealed this
Fourteenth Day of August, 2012

David J. Kappos
*Director of the United States Patent and Trademark Office*